US008750626B2

United States Patent
Ogura

(10) Patent No.: US 8,750,626 B2
(45) Date of Patent: Jun. 10, 2014

(54) APPARATUS, METHOD AND PROGRAM FOR DETECTING A DIFFERENCE BETWEEN A CURRENT IMAGE AND A PREVIOUS IMAGE

(75) Inventor: Sho Ogura, Kanagawa (JP)

(73) Assignee: Sony Corporation (JP)

( * ) Notice: Subject to any disclaimer, the term of this patent is extended or adjusted under 35 U.S.C. 154(b) by 196 days.

(21) Appl. No.: 12/932,441

(22) Filed: Feb. 25, 2011

(65) Prior Publication Data

US 2011/0229030 A1    Sep. 22, 2011

(30) Foreign Application Priority Data

Mar. 19, 2010   (JP) ................................ P2010-065117

(51) Int. Cl.
*G06K 9/68*   (2006.01)
*G06K 9/00*   (2006.01)

(52) U.S. Cl.
USPC .......................................... 382/219; 382/170

(58) Field of Classification Search
USPC ................. 382/164, 167, 168, 170–173, 190, 382/218–220, 224, 275; 375/240.02, 375/240.12; 358/509, 515, 518, 520, 522, 358/523; 348/672, 687; 345/426, 581, 613
See application file for complete search history.

(56) References Cited

U.S. PATENT DOCUMENTS

| | | | | |
|---|---|---|---|---|
| 5,359,369 A * | 10/1994 | Izawa et al. | ................. | 348/672 |
| 6,741,295 B2 * | 5/2004 | Nieuwenhuizen et al. | ... | 348/687 |
| 7,079,157 B2 * | 7/2006 | Deering | ..................... | 345/613 |
| 7,245,764 B2 * | 7/2007 | Nishizawa | ................... | 382/168 |
| 2003/0034974 A1 * | 2/2003 | Welch et al. | ................. | 345/426 |
| 2003/0052890 A1 * | 3/2003 | Raskar et al. | ................ | 345/581 |
| 2008/0219564 A1 * | 9/2008 | Covell et al. | ................. | 382/224 |
| 2009/0297038 A1 * | 12/2009 | Ishikawa et al. | ............. | 382/209 |
| 2010/0208982 A1 * | 8/2010 | Shimamura et al. | ........ | 382/154 |
| 2010/0246965 A1 * | 9/2010 | Epshtein et al. | ............. | 382/187 |
| 2011/0229030 A1 * | 9/2011 | Ogura | ......................... | 382/170 |
| 2012/0155764 A1 * | 6/2012 | Ogura | ......................... | 382/171 |

FOREIGN PATENT DOCUMENTS

JP    2008-077517 A    4/2008

* cited by examiner

*Primary Examiner* — Amir Alavi
(74) *Attorney, Agent, or Firm* — Lerner, David, Littenberg, Krumholz & Mentlik, LLP

(57) ABSTRACT

An image processing apparatus is disclosed which includes: an acquisition section configured to acquire image data of an image; a histogram calculation section configured to calculate a histogram of the acquired image data; a histogram storage section configured to store the calculated histogram that is updated sequentially; and a change determination section configured to determine whether a change has occurred in the acquired image based on the degree of similarity between the calculated histogram and the previously stored histogram.

13 Claims, 15 Drawing Sheets

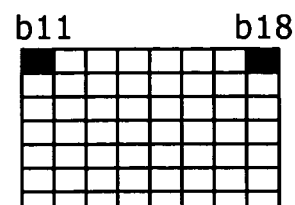
FIG. 7A
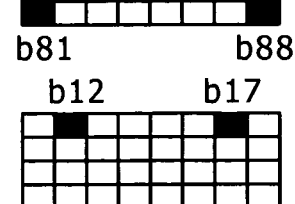
FIG. 7B
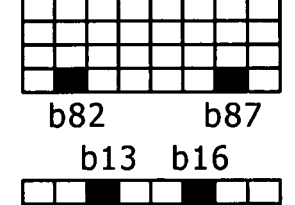
FIG. 7C
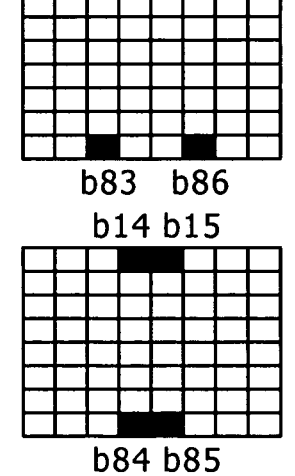
FIG. 7D
FIG. 7E
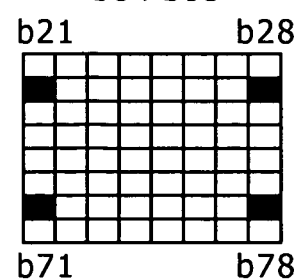
FIG. 7F
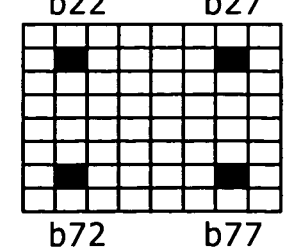

APPARATUS, METHOD AND PROGRAM FOR DETECTING A DIFFERENCE BETWEEN A CURRENT IMAGE AND A PREVIOUS IMAGE

CROSS-REFERENCE TO RELATED APPLICATION

The present application claims priority from Japanese Patent Application No. JP 2010-065117 filed in the Japanese Patent Office on Mar. 19, 2010, the entire content of which is incorporated herein by reference.

BACKGROUND OF THE INVENTION

1. Field of the Invention

The present invention relates to an image processing apparatus, an image processing method, and a program. More particularly, the invention relates to an image processing apparatus, an image processing method, and a program for detecting a change in an image using a limited storage capacity.

2. Description of the Related Art

There exist surveillance systems that take images of a predetermined target space using a surveillance camera in order to detect from the taken images intruders such as humans or animals into the target space. This type of surveillance system cannot conduct surveillance if its surveillance camera is diverted from its intended direction by an act of sabotage.

Some techniques have been proposed to bypass that weak point of the system. The techniques (e.g., proposed in Japanese Patent Laid-Open No. 2008-77517) involve calculating the difference in brightness value between the image currently taken by the surveillance camera and a previously stored reference image so as to determine that an act of sabotage has been committed if the calculated difference is above a predetermined value.

FIG. 1 is a schematic view explanatory of how images taken by a surveillance camera are updated. As shown in FIG. 1, when frames F1 through F6 are acquired sequentially, an image typically obtained every other frame is stored as the image of reference subject to sequential update. That is, this example involves the frames F1, F3 and F5 being updated sequentially as the reference image.

Where there is no act of sabotage, a chronologically previous background image and a chronologically subsequent background image remain the same and the difference in brightness value between the two images is small. By contrast, if the surveillance camera is diverted from its intended direction by an act of sabotage, the chronologically previous background image and the chronologically subsequent background image become different and the difference therebetween in brightness value becomes larger.

Thus when the frame F3 is obtained, the difference in brightness value is calculated between the frame F3 and the frame F1 that is the previous image serving as the reference image at this point in time. Likewise, when the frame F5 is acquired, the difference in brightness value is calculated between the frame F5 and the frame F3 that is the previous image serving as the reference image at this point. If the calculated difference turns out to be significantly large, then it is determined that an act of sabotage has been committed.

SUMMARY OF THE INVENTION

Where the difference in brightness value between the current image and the reference image is calculated in order to detect acts of sabotage, it is necessary to store the reference image. However, to store the reference image requires preparing a memory of a large storage capacity. This requirement can make the system of surveillance costly.

The present invention has been made in view of the above circumstances and provides innovative arrangements for detecting image changes using a limited storage capacity at a low cost.

In carrying out the present invention and according to one embodiment thereof, there is provided an image processing apparatus including: acquisition means for acquiring image data of an image; histogram calculation means for calculating a histogram of the acquired image data; histogram storage means for storing the calculated histogram that is updated sequentially; and change determination means for determining whether a change has occurred in the acquired image based on the degree of similarity between the calculated histogram and the previously stored histogram.

Preferably, the image processing apparatus of the present invention may further include: division means for dividing the acquired image into N blocks, N being larger than one; and designation means for designating, every time the image data of a new image is acquired, sequentially M out of the N blocks, M being larger than one, as the blocks to be updated. The histogram calculation means may calculate the histogram of the designated M blocks. The change determination means may determine whether a change has occurred in the acquired image based on the degree of similarity between the calculated histogram of the designated M blocks on the one hand and the previous histogram of the corresponding M blocks being stored on the other hand.

Preferably, the designation means may designate sequentially the M blocks in such a manner that at least two of the M blocks differ from one another in the direction of positional change in the image.

Preferably, the designation means may designate M to be four so as to divide the image into four groups and designate one block from each of the four groups.

Preferably, the division means may designate sequentially the M blocks by preferentially selecting the farthest of the blocks.

Preferably, the division means may divide the image in such a manner that the block side perpendicular to the direction of positional change may become longer than the block side in parallel with the direction of positional change.

Preferably, the change determination means may include: similarity degree calculation means for calculating the degree of similarity between the calculated histogram of the designated M blocks on the one hand and the previous histogram of the corresponding M blocks being stored on the other hand; and similarity degree threshold value determination means for determining that a change has occurred in the M blocks of the image if a comparison between the calculated histogram and a similarity degree threshold value reveals that the degree of similarity is larger than the similarity degree threshold value.

Preferably, the image processing apparatus according to the embodiment of the present invention may further include alarm output means for outputting an alarm if a change is determined to have occurred in the image.

Preferably, the alarm output means may include: counter means for counting the number of blocks in which a change is determined to have occurred; and alarm threshold value determination means for outputting the alarm if a comparison between the number counted by the counter means and an alarm threshold value reveals that the counted number is above the alarm threshold value.

According to other embodiments of the present invention, there are provided an image processing method and a program functionally corresponding to the above-outlined image processing apparatus embodying the invention.

Where the present invention is embodied as outlined above, the image data of an image is first acquired. A histogram of the acquired image data is calculated. The calculated histogram is updated sequentially and stored. It is then determined whether a change has occurred in the acquired image based on the degree of similarity between the calculated histogram and the previously stored histogram.

According to the present invention outlined above, it is possible to detect a change in the image at a low cost using a limited storage capacity.

BRIEF DESCRIPTION OF THE DRAWINGS

FIGS. 7A through 7F are schematic views explanatory of how the blocks to be updated are moved;

DETAILED DESCRIPTION OF THE PREFERRED EMBODIMENTS

[Principle of Changed Region Detection]

Figure 1:
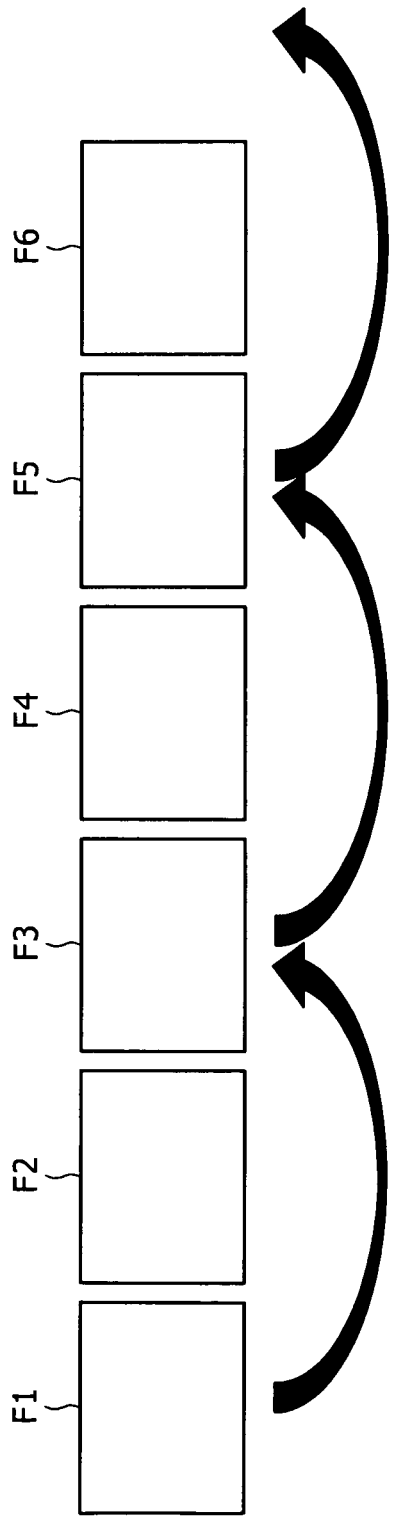
FIG. 1 is a schematic view explanatory of how images are usually updated.
Figure 2:
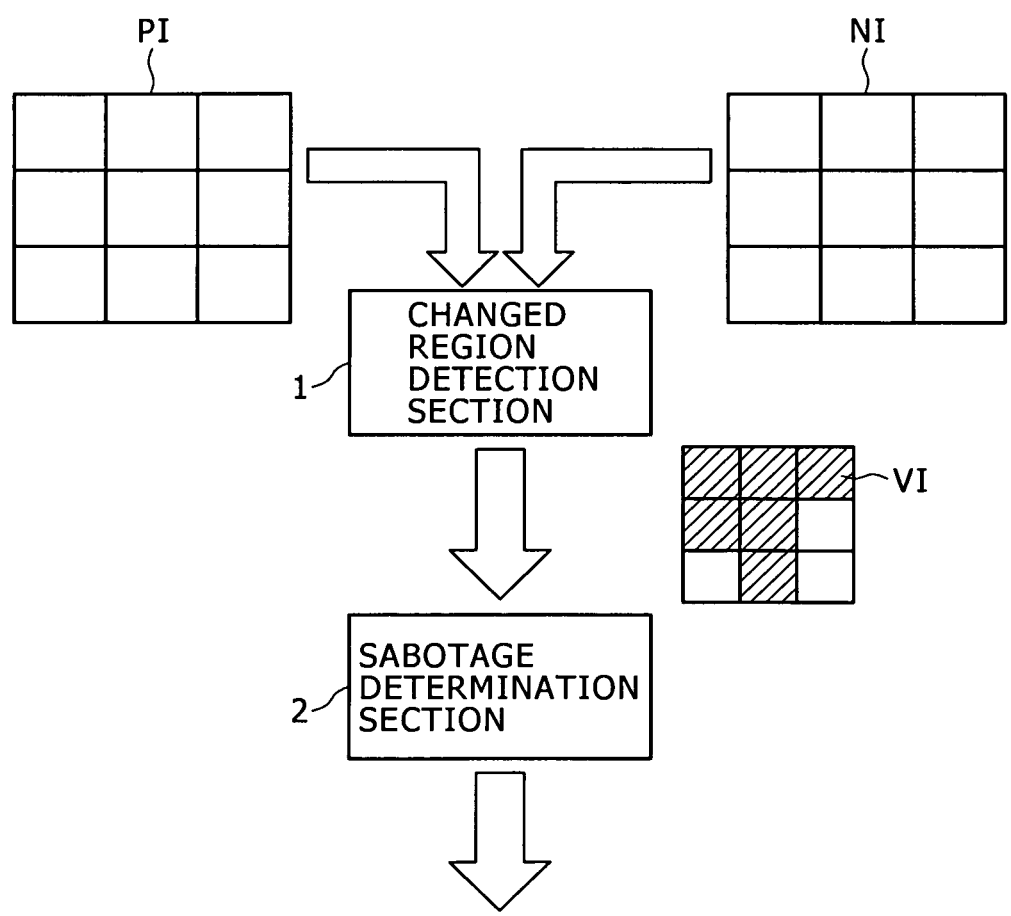
FIG. 2 is a schematic view explanatory of the principle of changed region detection.

FIG. 2 is a schematic view explanatory of the principle of changed region detection. In one embodiment of the present invention, a past image PI and a current image NI are input to a changed region detection section 1. The changed region detection section 1 divides each of the past image PI and current image NI into blocks of a predetermined size. A histogram is calculated of the pixel values of each block. The degree of similarity is then calculated between the histogram of the block at a given position in the past image PI on the one hand, and the histogram of the block at the corresponding position in the current image NI on the other hand. The blocks in which the degree of similarity is determined to be significantly low are detected as changed regions VI.

If the number of changed regions VI is significantly large, a sabotage determination section 2 determines that an act of sabotage has been committed and outputs an alarm accordingly.

[Structure of the Image Processing Apparatus]

Figure 3:
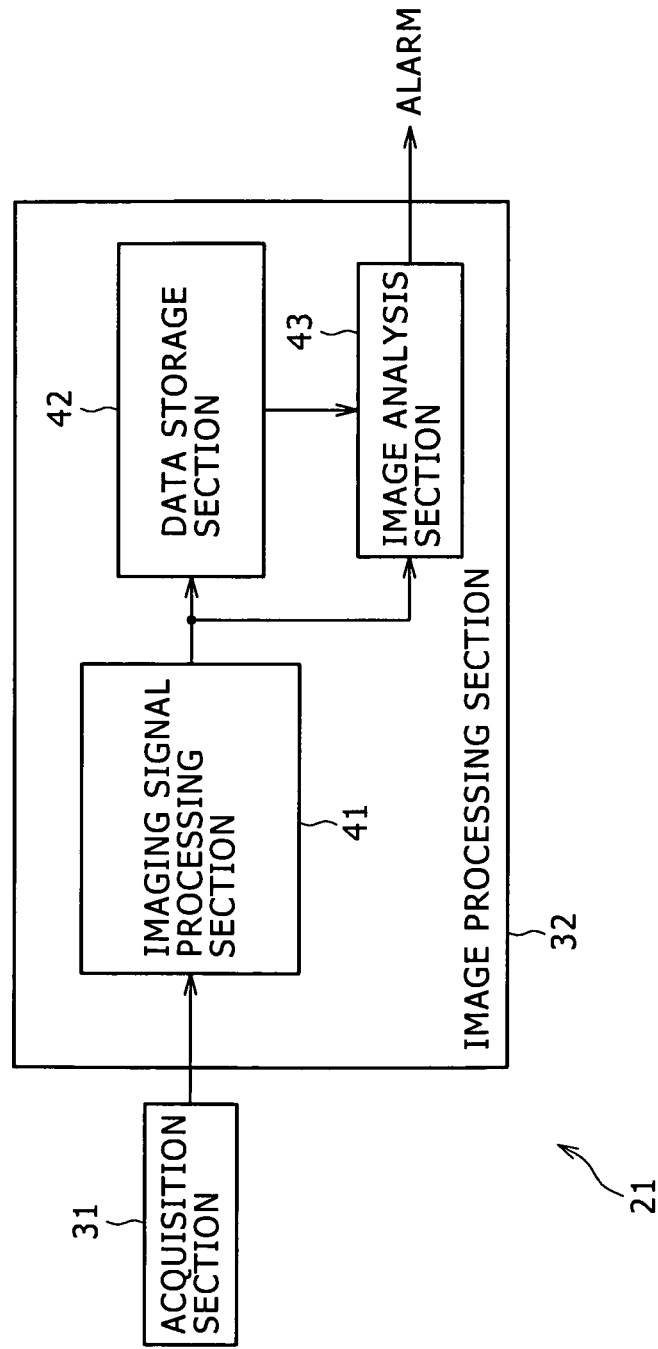
FIG. 3 is a block diagram showing a structure of an image processing apparatus as one embodiment of the present invention.

FIG. 3 is a block diagram showing a structure of an image processing apparatus 21 as one embodiment of the present invention. The image processing apparatus 21 is made up of an acquisition section 31 and an image processing section 32.

The acquisition section 31 serving as a means to acquire image data of images incorporates an imaging section such as a camera or a video camera. The acquisition section 31 outputs the image data obtained by imaging an object such as a predetermined target space monitored by the imaging section. Also, the acquisition section 31 may acquire the image data supplied from an external source via a network.

The image processing section 32 is constituted by an imaging signal processing section 41, a data storage section 42, and an image analysis section 43.

The imaging signal processing section 41 typically composed of a DSP (digital signal processor) performs various image-related processes such as black level correction, white balance control, gamma correction, and color calibration. The data storage section 42 typically made of a RAM (random access memory) stores the image data processed by the imaging signal processing section 41. The image analysis section 43 typically constituted by a CPU (central processing unit) analyzes the current image fed from the imaging signal processing section 41 as well as the past image which is supplied from the data storage section 42 and which serves as a reference image.

[Structure of the Image Analysis Section]

Figure 4:
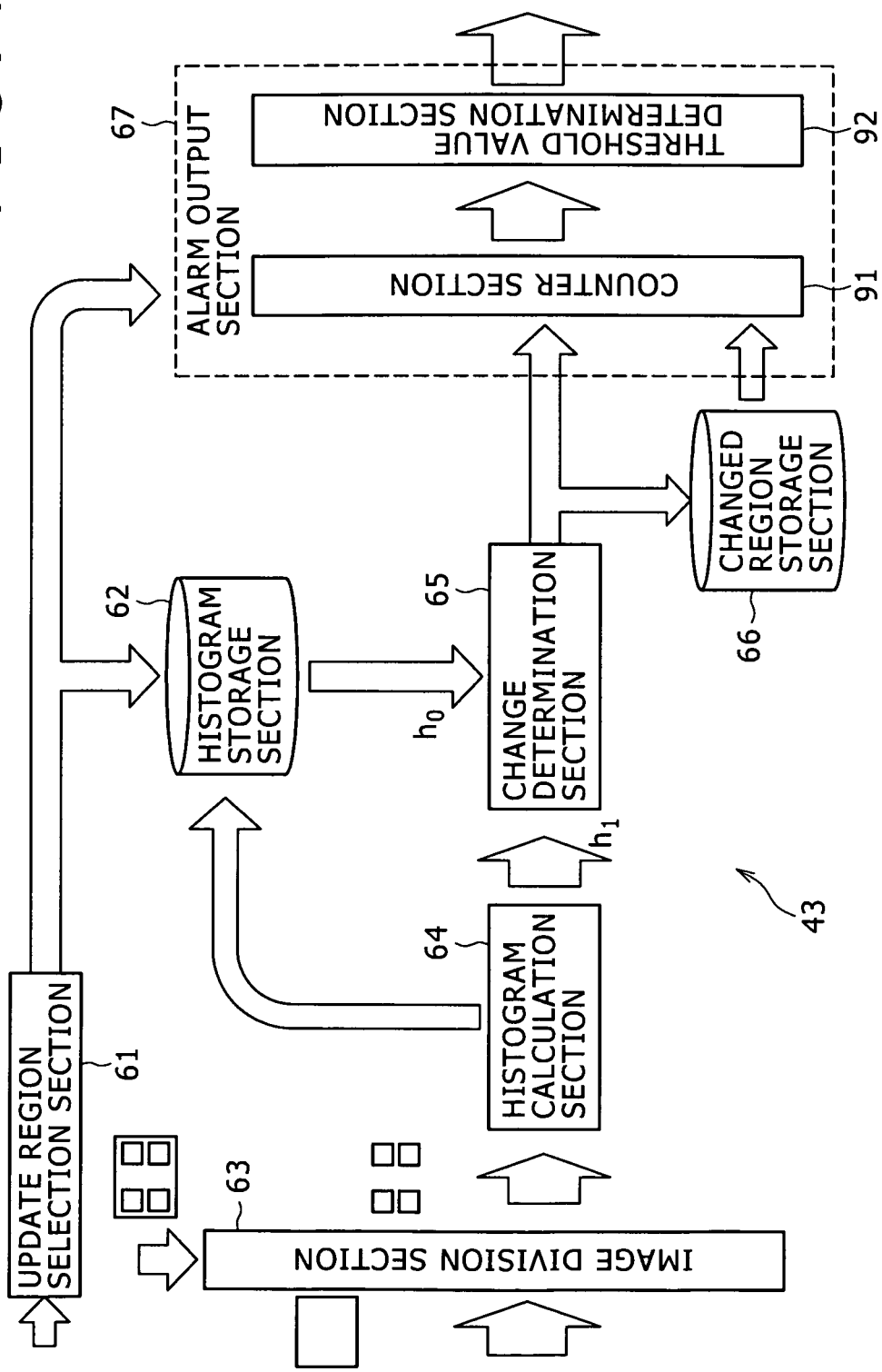
FIG. 4 is a block diagram showing a functional structure of an image analysis section.

FIG. 4 is a block diagram showing a functional structure of the image analysis section 43. The image analysis section 43 is made up of an update region selection section 61, a histogram storage section 62, an image division section 63, a histogram calculation section 64, a change determination section 65, a changed region storage section 66, and an alarm output section 67.

Part or all of the components shown in FIG. 4 may be provided not in the image analysis section 43 but in the imaging signal processing section 41 or data storage section 62. The histogram storage section 62 corresponds to the data storage section 42 in FIG. 3.

The update region selection section 61 functions as a means to designate sequentially M (M>1) out of N blocks as the blocks to be updated every time the image data of a new image is acquired. From the data supplied from the imaging signal processing section 41, the update region selection section 61 extracts the frame number of the image acquired by the acquisition section 31 so as to determine the frame number to be updated. Also, the update region selection section 61 determines the blocks to be updated in the frame to be updated. The image division section 63 functions as a means to divide the acquired image into N blocks (N>1). Given the frames constituting the image based on the image data fed from the imaging signal processing section 41, the image division section 63 divides the frame designated by the update region selection section 61 into a plurality of blocks. Furthermore, the image division section 63 supplies the histogram calculation section 64 with the image data of the blocks designated by the update region selection section 61 out of the divided blocks.

The histogram calculation section 64 serving as a means to calculate a histogram of the acquired image data calculates the histogram of the blocks supplied from the image division section 63. Alternatively, the imaging signal processing section 41 may be furnished with a histogram calculation facility. In that case, the histogram calculation section 64 may be incorporated in the imaging signal processing section 41.

The histogram storage section 62 serving as a means to update sequentially the calculated histogram and store the updated histogram updates the histogram of the blocks designated as the update regions by the update region selection section 61. That is, the histogram of the blocks to be updated in the current frame supplied from the histogram calculation section 64 is used to replace the histogram of the corresponding blocks in the past frame being stored.

Based on the degree of similarity between the calculated histogram and the past histogram being stored, the change determination section 65 performs change determination by serving as a means to determine whether there is a change in the acquired image. That is, the change determination section 65 determines whether there is a change in the image based on the histogram of the blocks to be updated in the current frame fed from the histogram calculation section 64 and on the histogram of the corresponding blocks in the past frame supplied from the histogram storage section 62. The changed region storage section 66 stores the result of the determination performed by the change determination section 65.

If a change is determined to have occurred in the image, the alarm output section 67 serves as a means to output an alarm. The alarm output section 67 is made up of a counter section 91 and a threshold value determination section 92.

The counter section 91 serves as a means to count the number of the blocks in which a change is determined to have occurred. Based on the output of the change determination section 65 and on the output of the changed region storage section 66, the counter section 91 counts the number of the blocks in which a change is determined to have occurred in a given image under surveillance. The threshold value determination section 92 serves as a means to compare the counted number with an alarm threshold value and to output an alarm if the counted number is above the alarm threshold value. The threshold value determination section 92 thus compares the number of blocks counted by the counter section 91 with a predetermined threshold value. If the counted number of blocks is larger than the threshold value, then the threshold value determination section 92 determines that an act of sabotage has been committed and outputs a detection signal accordingly. Typically, the detection signal may be given as an alarm.

[Structure of the Change Determination Section]

Figure 5:
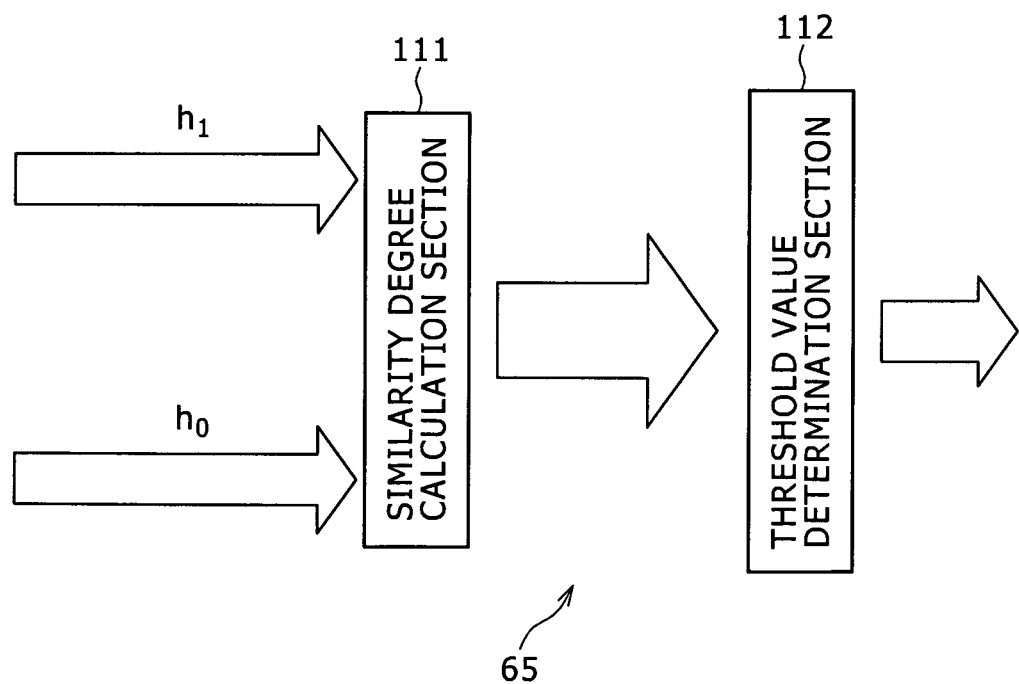
FIG. 5 is a block diagram showing a functional structure of a change determination section.

FIG. 5 is a block diagram showing a functional structure of the change determination section 65. The change determination section 65 is made up of a similarity degree calculation section 111 and a threshold value determination section 112.

The similarity degree calculation section 111 functions as a means to calculate the degree of similarity between the histogram of the calculated blocks and the histogram of the past blocks being stored. The similarity degree calculation section 111 thus compares a histogram h1 of the current block fed from the histogram calculation section 64 with a histogram h0 of the past block at the corresponding position supplied from the histogram storage section 62. The threshold value determination section 112 serves as a means to compare the calculated degree of similarity with a similarity degree threshold value to determine that a change has occurred in the block of the image if the degree of similarity is larger than the similarity degree threshold value. The threshold value determination section 112 thus compares the calculated degree of similarity with a predetermined threshold value and outputs the detection signal based on the result of the comparison.

[Change Determination Process]

Figure 6:
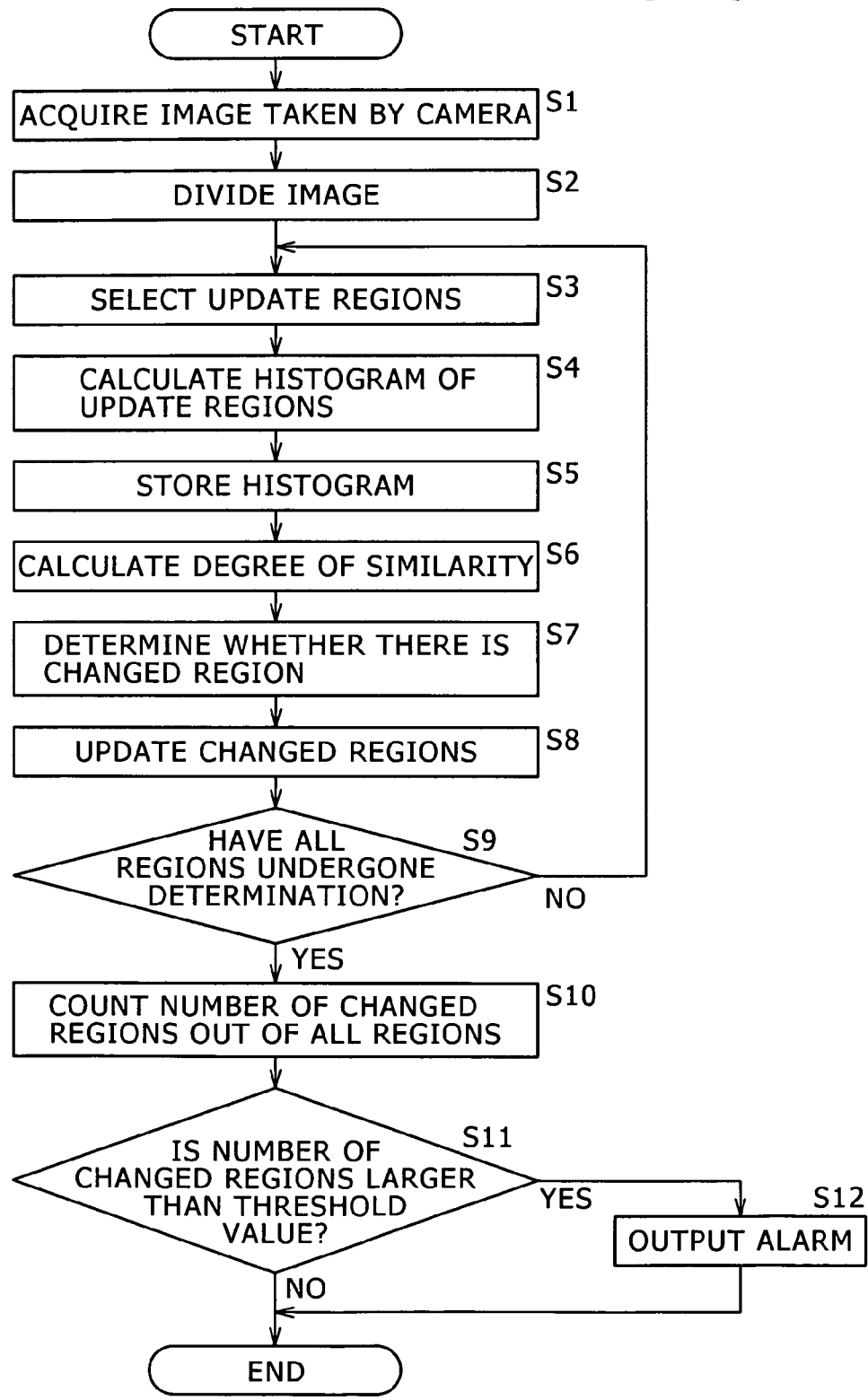
FIG. 6 is a flowchart explanatory of a change determination process.

FIG. 6 is a flowchart explanatory of a change determination process. The change determination process will now be explained below in reference to FIG. 6.

In step S1, the acquisition section 31 acquires an image taken by camera. That is, the imaging section takes an image of a predetermined object of surveillance and the image data of the image thus taken is acquired by the acquisition section 31.

In step S2, the image division section 63 divides the image into N blocks. With this embodiment, each of the frames based on the image data is divided into 8×8 blocks.

In step S3, the update region selection section 61 selects update regions. That is, the update region selection section 61 selects M (M<N) blocks to be updated out of the 8×8 blocks. The selection of the update regions is explained below in reference to FIGS. 7A through 7F.

FIGS. 7A through 7F are schematic views explanatory of how the blocks to be updated are moved. With this embodiment, the number M of blocks to be updated is set to be 4. A total of 8×8 blocks are divided into four groups each composed of 4×4 blocks. One block is selected from each of the four groups to make up a total of four blocks to be updated. More specifically, as shown in FIG. 7A, the update region selection section 61 selects four update blocks consisting of a block b11 at the leftmost position of row 1, a block b18 at the rightmost position of the same row 1, a block b81 at the leftmost position of row 8, and a block b88 at the rightmost position of the same row 8 out of the 8×8 blocks in the first frame.

In FIGS. 7A through 7F, the block located on the i-th row from the top and on the j-th column from the left is indicated as bij. The same also applies to FIGS. 11 through 18, to be discussed later.

Then as shown in FIG. 7B, the update region selection section 61 selects four update blocks consisting of a block b12 on the right next to the block b11 at the leftmost position of row 1, a block b17 on the left next to the block b18 at the rightmost position of the same row 1, a block b82 on the right next to the block b81 at the leftmost position of row 8, and a block b87 on the left next to the block b88 at the rightmost position of the same row 8 out of the 8×8 blocks in the next frame.

Next, as shown in FIG. 7C, the update region selection section 61 selects four update blocks consisting of a block b13 on the right next to the block b12 on row 1, a block b16 on the left next to the block b17 on the same row 1, a block b83 on the right next to the block b82 on row 8, and a block b86 on the left next to the block b87 on the same row 8 out of the 8×8 blocks in the next frame.

Next, as shown in FIG. 7D, the update region selection section 61 selects four update blocks consisting of a block b14 on the right next to the block b13 on row 1, a block b15 on the left next to the block b16 on the same row 1, a block b84 on the right next to the block b83 on row 8, and a block b85 on the left next to the block b86 on the same row 8 out of the 8×8 blocks in the next frame.

When the selection and the movement of the update blocks on the top row and the bottom row are completed, row 2 and row 7 are selected. As shown in FIG. 7E, the update region selection section 61 then selects four update blocks consisting of a block b21 at the leftmost position of row 2, a block b28 at the rightmost position of the same row 2, a block b71 at the leftmost position of row 7, and a block b78 at the rightmost position of the same row 8 out of the 8×8 blocks in the next frame.

Then as shown in FIG. 7F, the update region selection section 61 selects four update blocks consisting of a block b22 on the right next to the block b21 on row 2, a block b27 on the left next to the block b28 on the same row 2, a block b72 on the right next to the block b71 on row 7, and a block b77 on the left next to the block b78 on the same row 7 out of the 8×8 blocks in the next frame.

Thereafter, four blocks to be updated are selected sequentially in like manner in each frame. That is, in the upper left quadrant of a given frame, the blocks are selected sequentially from left to right and the rows are selected sequentially from top to bottom. In the upper right quadrant of the frame, the blocks are selected sequentially from right to left and the rows are selected sequentially from top to bottom. In the lower left quadrant of the frame, the blocks are selected sequentially from left to right and the rows are selected sequentially from bottom to top. In the lower right quadrant of the frame, the blocks are selected sequentially from right to left and the rows are selected sequentially from bottom to top.

Returning to FIG. 6, the histogram calculation section 64 in step S4 calculates the histogram of the update regions.

Figure 8A:
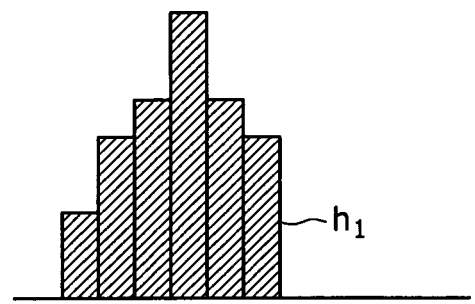
FIGS. 8A and 8B are graphic representations explanatory of typical histograms.
Figure 8B:
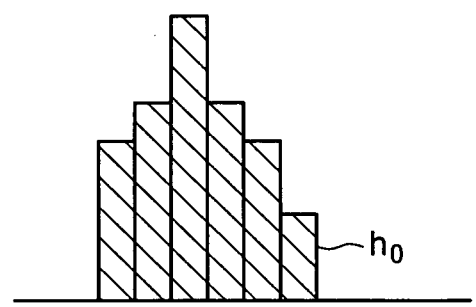

FIGS. 8A and 8B are graphic representations explanatory of typical histograms. The horizontal axis indicates pixels values typified by brightness values, and the vertical axis denotes the number of the pixels having pixel values of a predetermined range. FIG. 8A shows a typical histogram of one block to be updated in the current frame, the histogram being calculated by the histogram calculation section 64. FIG. 8B shows a typical histogram of the block at the corresponding position in the past frame, the histogram being stored in the histogram storage section 62.

In step S5, the histogram storage section 62 stores the histogram calculated in step S4. Because the histogram storage section 62 stores past data in the form of histograms, it is possible to use a significantly small storage capacity at a low cost as opposed to ordinary cases in which past data is stored typically as pixel values constituting image data.

In step S6, the similarity degree calculation section 111 calculates the degree of similarity between the histogram h1 of one block to be updated in the current frame, the histogram h1 having been calculated in step S4 on the one hand, and the histogram h0 of the block at the corresponding position in the past frame, the histogram h0 being stored in the histogram storage section 62 on the other hand.

With this embodiment, the degree of similarity is calculated using intersection and based on the expression shown below. That is, for each pixel value, what is obtained is the sum in effect when the number of pixels is the smaller of the two blocks. The value D of the expression (1) below is larger when the degree of similarity is higher and is smaller when the degree of similarity is lower. The value Ai in the expression (1) denotes one pixels value of the histogram h1 of one block to be updated in the current frame, and the value Bi in the expression (1) stands for one pixel value of the histogram h0 of the block at the corresponding position in one past frame, the histogram h0 being stored in the histogram storage section 62. The comparison is performed between the current frame and each of the most recent N frames (N>1).

$$D = \Sigma \min(A_i, B_i) \quad (1)$$

Figure 9A:
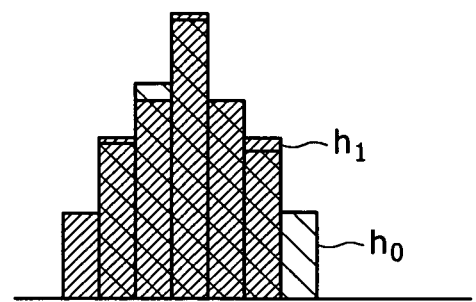
FIGS. 9A and 9B are graphic representations explanatory of the degree of similarity between histograms.
Figure 9B:
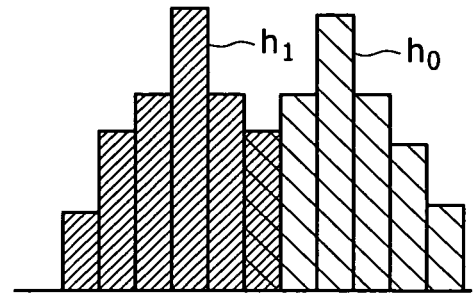

FIGS. 9A and 9B are graphic representations explanatory of the degree of similarity between histograms. Where the histograms h1 and h0 mostly overlap with one another as shown in FIG. 9A, the value D calculated using the expression (1) above tends to be larger. By contrast, where few portions of the histograms h1 and h0 overlap as shown in FIG. 9B, the value D becomes smaller.

In step S7, the threshold value determination section 112 determines changed regions. That is, the degree of similarity D calculated in step S6 is compared with a predetermined threshold value Thd. If the degree of similarity D for a given block is smaller than the threshold value Thd, then that block is determined to be one in which a change has occurred. If at least one of the most recent N frames turns out to be a frame in which the degree of similarity D is smaller than the threshold value Thd, then a changed region is recognized.

In step S8, the changed region storage section 66 updates changed regions. That is, the changed region storage section 66 retains the result of the determination of each frame per block (i.e., as many determination results as the number of the blocks involved). The changed region storage section 66 updates the old determination results using the result from step S7.

In step S9, the change determination section 65 determines whether all regions have been checked for change determination. If not all regions are checked yet, then control is returned to step S3, a new region to be updated is selected, and the same process is repeated. For example, in the case of the blocks shown in FIG. 7A, the block b11 is first checked for change determination followed by the block b18.

Where all regions have been checked for change determination, e.g., where the blocks b11, b18, b81 and b88 in FIG. 7A have all been checked for change determination, step S10 is reached. In step S10, the counter section 91 counts the number of changed regions out of all regions. The changed region storage section 66 stores which of the 64 blocks making up the frame of the image under surveillance have been changed. At this point in time, out of the 64 blocks, the counter section 91 counts the number of the blocks in which a change is determined to have occurred.

In step S11, the threshold value determination section 92 determines whether the number of changed regions is larger than a threshold value. That is, a comparison is made between a predetermined threshold value Thc and the number of the blocks in which a change is determined to have occurred, the blocks having been counted in step S10.

If in step S11 the number of the blocks determined to have been changed turns out to be larger than the threshold value Thc, then step S12 is reached. In step S12, the alarm output section 67 outputs a signal such as an alarm indicative of the change in the image.

The process is terminated if the number of the changed blocks is determined to be smaller than the threshold value Thc in step S11, or upon completion of step S12.

The above-described process is carried out for each frame.

[Movement of Blocks]

Figure 10:
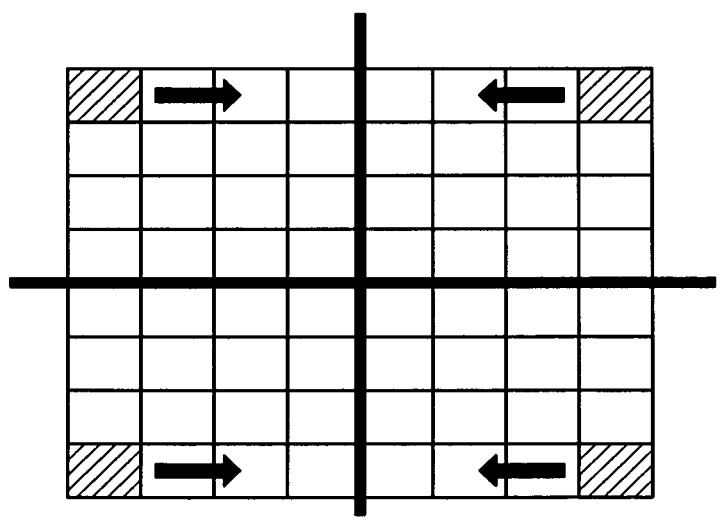
FIG. 10 is a schematic view explanatory of how the blocks to be updated are moved.

FIG. 10 is a schematic view explanatory of how the blocks to be updated are moved. With this embodiment, as shown in FIG. 10, the blocks to be updated are moved per frame horizontally in two different directions: leftward and rightward. As a result, a change in the horizontal direction can be detected sensitively. Specific examples of this type of detection are shown in FIGS. 11 and 12.

Figure 11:
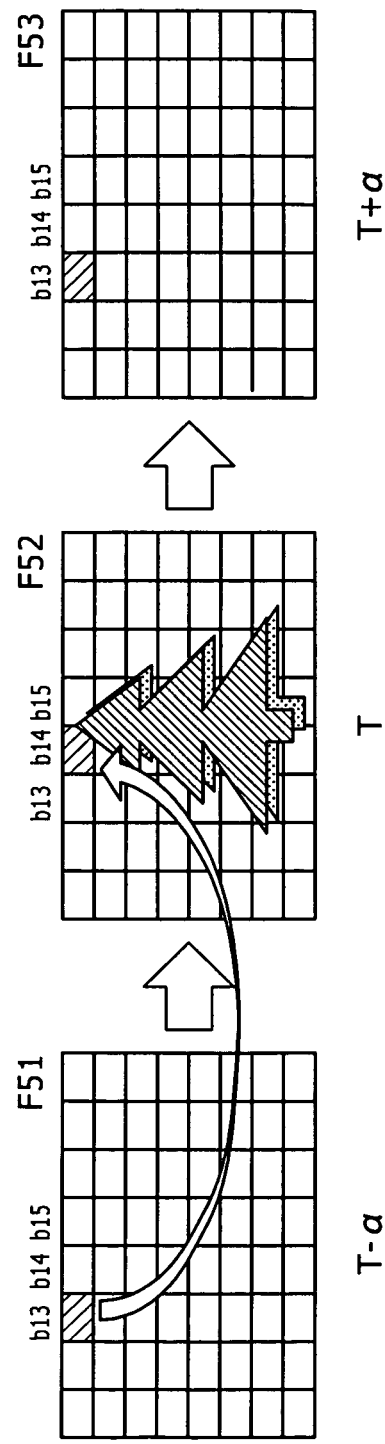
FIG. 11 is a schematic view explanatory of an update interval.

FIG. 11 is a schematic view explanatory of an update interval in effect when a rapid movement of the imaging section has occurred as a result of an act of sabotage. Suppose now that the imaging section of the acquisition section 31 is rapidly diverted leftward in direction by an act of sabotage. In this case, the images change as follows. Nothing is imaged in the blocks b11 through 88 of a frame F51 on the left in FIG. 11. In a frame F52 given a time α after the frame F51, an image is shown in the middle of FIG. 11. In this frame, parts of a single tree are imaged in blocks b14, b15, b24, b25, b34, b35, b43 through b46, b53 through b56, b63 through b66, b72 through b77, b84 and b85. In a frame F53 given another time α after the frame F52, no part of the tree is imaged in the blocks b11 through b88 as shown on the right in FIG. 11.

The update interval between blocks is short. For example, after the block b13 is updated in the frame F51, the block b14 to the immediate right of the block 13 is updated in the next frame F52. Likewise, as shown in FIGS. 7C and 7D, after the blocks b16, b83 and b86 are updated in the frame F51, the blocks b15, b84 and b85 are updated in the frame F52. When the blocks b14, b15, b84 and b85 are updated in the frame F52, the frame F51 is included in the image of the most recent N frames. For this reason, the blocks having been updated are detected as changed regions. Thus the changes in the block images make it possible to detect the rapid movement of the imaging section attributable to an act of sabotage.

Figure 12:
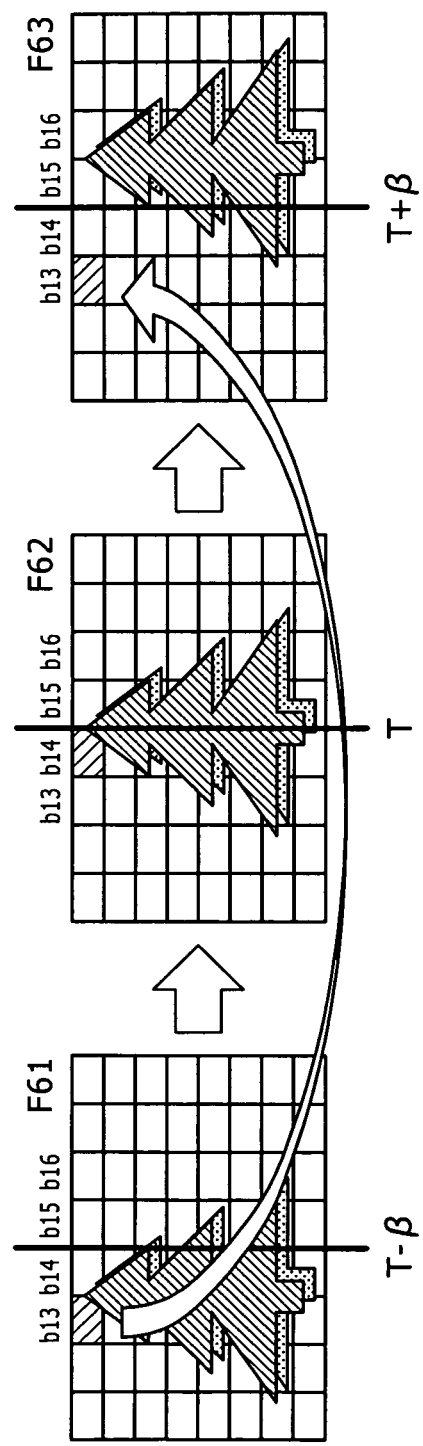
FIG. 12 is a schematic view explanatory of another update interval.

FIG. 12 is a schematic view explanatory of another update interval in effect when a slow movement of the imaging section has occurred. Suppose now that the imaging section of the acquisition section 31 is slowly diverted leftward in direction by an act of sabotage. In this case, frames F61 through F63 given at intervals of a time β are shown. In the frame F61, parts of a tree are imaged in blocks b13, b14, b23, b24, b33, b34, b42 through b45, b52 through b55, b62 through b65, b71 through b76, b72 through b77, b83, and b84. In the frame F62, parts of the tree are imaged in blocks b14, b15, b24, b25, b34, b35, b43 through b46, b53 through b56, b63 through b66, b72 through b77, b84, and b85. In the frame F63, parts of the tree are imaged in blocks b15, b16, b25, b26, b35, b36, b44 through b47, b54 through b57, b64 through b67, b73 through b78, b85, and b86.

The update interval between the same blocks is long. Where 64 blocks are to be updated four at a time, the same block is updated every 16 frames (=64/4). For example, the block b13 updated in the frame F61 is updated 16 frames later in the frame F63. The blocks b16, b83 and b86 are updated likewise as shown in FIG. 7C. If the blocks b13, b16, b83 and b86 are to be updated in the frame F63 and if the frame F61 is included in the images of the most recent N frames, then these updated blocks are detected as changed regions. Thus the changed block images make it possible to detect a slow movement of the imaging section caused by an act of sabotage.

As described above, it is necessary to shorten the update interval between blocks in order to detect the rapid movement, and to prolong the update interval between the same blocks in order to detect the slow movement. The frame count N stored in the histogram storage section 62 is set to be the number of frames ranging from the frame in which the block at the same position is updated, to the frame in which the block immediately preceding the corresponding block is updated.

[Detection of Image Changes Taking Place Where the Entire Frame Image is Updated]

Explained below for reference is how the whole image of a given frame is updated as opposed to the image being updated in units of a block.

Figure 13:
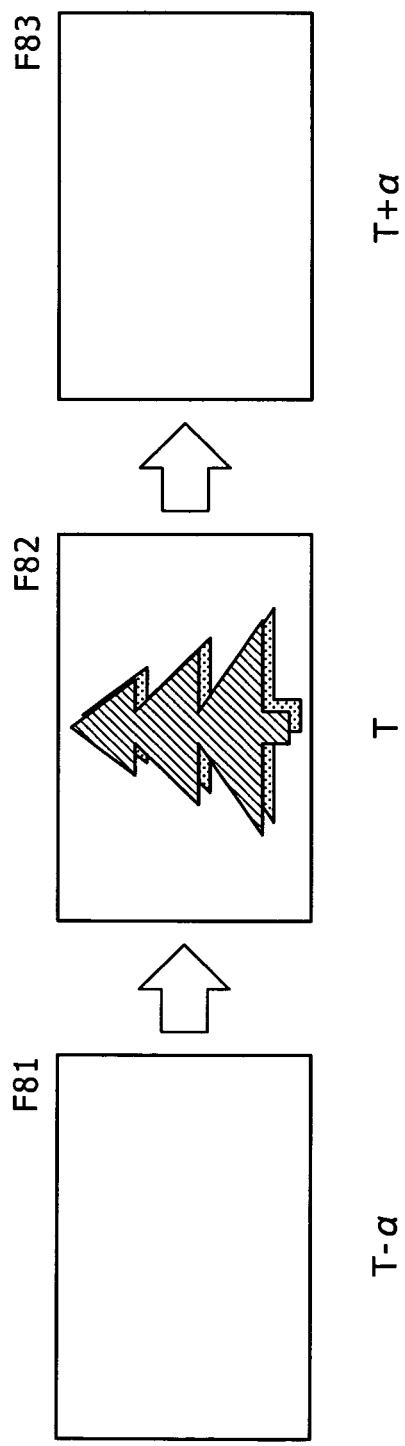
FIG. 13 is a schematic view explanatory of another update interval.
Figure 14:
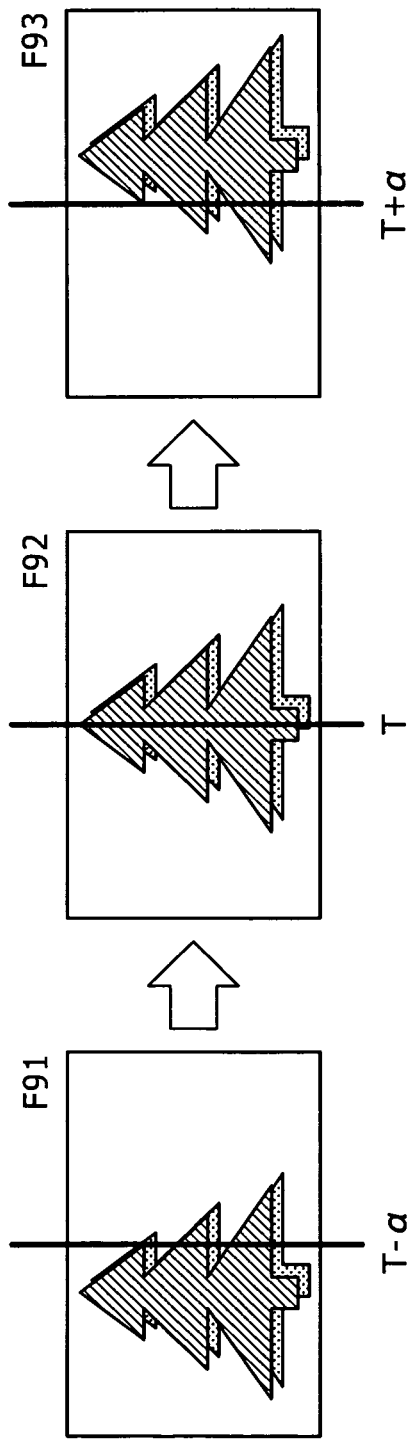
FIG. 14 is a schematic view explanatory of another update interval.

FIGS. 13 and 14 are schematic views each explanatory of an image update interval in effect when the whole image of a given frame is updated. FIGS. 13 and 14 correspond to FIGS. 11 and 12, respectively.

FIG. 13 shows image changes taking place when the imaging section of the acquisition section 31 is diverted rapidly leftward in direction by an act of sabotage. In a frame F81 on the left of FIG. 13, nothing is imaged. In a frame F82 reached a time a after the frame F81, a tree is imaged as shown in the middle of FIG. 13. In a frame F83 reached another time a later, no tree is imaged as shown on the right of FIG. 13.

FIG. 14 shows image changes taking place when the imaging section of the acquisition section 31 is diverted slowly leftward in direction by an act of sabotage. In a frame F91 on the left of FIG. 14, a tree is imaged somewhat left of center on the screen. In a frame F92 reached a time a after the frame F91, the tree is imaged at the approximate center of the screen as shown in the middle of FIG. 14. In a frame F93 reached another time α later, the tree is imaged somewhat right of center on the screen as shown on the right of FIG. 14.

If the imaging section of the acquisition section 31 is rapidly diverted leftward in direction by an act of sabotage as shown in FIG. 13, the frame F82 upon its update is compared with the frame F81, and the frame F83 upon its update is compared with the frame F82. The comparisons permit detection of an act of sabotage that may have been committed. However, where the update interval is prolonged as when the frame F83 upon its updated is compared with the frame F81, changes in the image cannot be detected.

On the other hand, when an act of sabotage is committed slowly as shown in FIG. 14, comparing the frame F92 upon its update with the frame F91 fails to detect changes in the image. Likewise, comparing the frame F93 upon its update with the frame F92 does not permit detection of any change in the image. Nor is it possible to detect any image change when the frame F93 is compared with the frame F91. That is, it is impossible to detect any image change until the position of the tree inside the screen is moved further right so that at least part of the tree disappears from the screen. In other words, a slowly committed act of sabotage can be detected only if the update interval is prolonged.

As described above, when the whole frame is to be updated, it is necessary to shorten the update interval in order to detect a rapidly committed act of sabotage, and to prolong conversely the update interval in order to detect a slowly committed act of sabotage. It is thus difficult to detect both kinds of sabotage. By contrast, as shown in FIGS. 11 and 12, this embodiment of the present invention updates images in units of a block and is thus capable of detecting both rapidly and slowly committed acts of sabotage.

[Order in Which Blocks are Moved]

Figure 15:
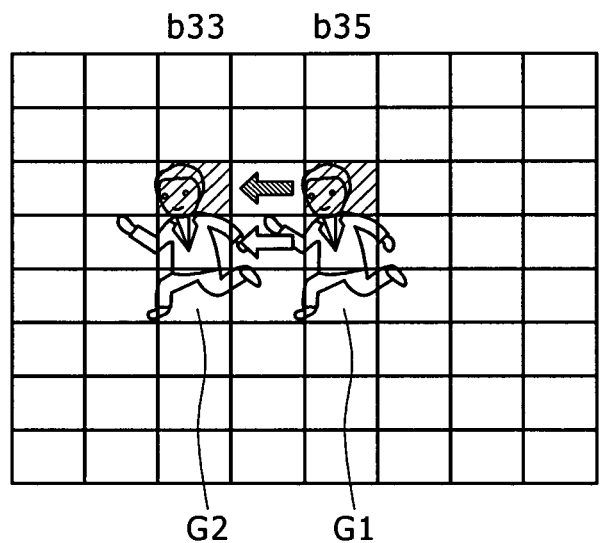
FIG. 15 is a schematic view explanatory of the relationship between the movement of a moving object and the movement of blocks.

FIG. 15 is a schematic view explanatory of the relationship between the movement of a moving object and the movement of blocks. It is assumed here that as shown in FIG. 15, the blocks to be updated are moved always from right to left on the screen. In this case, if a moving object G moves in the same direction as the blocks on the screen, i.e., from right to left, then a moving object G1 detected in a block b35 is also detected as a moving object G2 in a block b33. Consequently, a change in the image is erroneously detected to indicate an act of sabotage. In order to avoid such false detection, it is preferable to designate different directions in which the positions of at least two blocks to be updated are moved on the screen (e.g., rightward and leftward), as shown in FIG. 10. The moving directions may also be varied at random.

Figure 16:
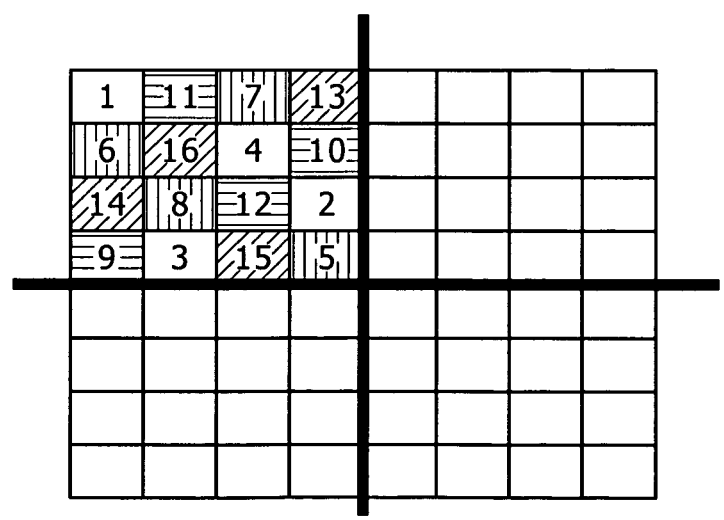
FIG. 16 is a schematic view showing an order in which the blocks to be updated are moved.

FIG. 16 is a schematic view showing an order in which the blocks to be updated are moved. In this example, as in the examples of FIGS. 7A through 7F and FIG. 10, 8×8 blocks are divided into four groups each composed of 4×4 blocks. One block is selected from each of the four groups to make up a total of four blocks to be updated. That is, the four groups consist of an upper left group, an upper right group, a lower left group, and a lower right group each made up of 4×4 blocks. From each group, one block is selected as the block to be updated so that four blocks are updated at a time. It should be noted that the rules for selecting one block from each group differ from those applicable to the examples of FIGS. 7A through 7F and FIG. 10.

In each group in the example of FIG. 16, predetermined blocks are sequentially selected to be updated out of the 4×4 blocks according to the rules given below. For purpose of illustration, these rules will be explained below based on the blocks in the upper left group shown in FIG. 16. The same rules also apply to the other groups when the blocks to be updated are selected.

Initially, the 4×4 blocks are divided into four subgroups according to the following rules:

Rule 1: Each subgroup has one corner block out of the 4×4 blocks.

Rule 2: In the same subgroup, the x and y coordinates of the blocks do not overlap between them.

Rule 3: In each subgroup, only two paired blocks are diagonally adjacent to each other.

In FIG. 16, the subgroups are distinguished from one another by pattern. The blocks marked by the same patter belong to the same subgroup. In the example of FIG. 16, the blocks numbered 1 through 4 constitute a first subgroup; the blocks numbered 5 through 8 make up a second subgroup; the blocks numbered 9 through 12 form a third subgroup; and the blocks numbered 13 through 16 compose a fourth subgroup.

In the example of FIG. 16, the first through the fourth subgroups have corner blocks numbered 1, 5, 9 and 13, respectively, according to the rule 1 above. According to the rule 2, each of the rows formed by the 4×4 blocks has one block of a different subgroup disposed therein, and each of the columns composed of the 4×4 blocks also has one block of a different subgroup disposed therein. According to the rule 3, the blocks numbered 2 and 4 in the first subgroup, the blocks numbered 6 and 8 in the second subgroup, the blocks numbered 10 and 12 in the third subgroup, and the blocks numbered 14 and 16 in the fourth subgroup are positioned diagonally adjacent to one another. This layout maximizes the shortest distance between the blocks in the same subgroup. That is, the layout makes it possible to keep the blocks as far apart as possible in the same subgroup.

Rule 4: The smallest-numbered blocks in the subgroups are positioned diagonally in the 4×4 blocks.

In the example of FIG. 16, the smallest-numbered blocks 1, 5, 9 and 13 of the first through the fourth subgroups are positioned diagonally.

The blocks in the same subgroup are updated in an order that complies with the following rules:

Rule 5: The corner block out of the 4×4 blocks is assigned the smallest number.

Rule 6: The block whose x coordinate is the farthest from the smallest numbered block determined according to the rule 5 above is assigned the second smallest number.

Rule 7: Of the remaining two blocks, the block whose x coordinate is the farthest from the second smallest numbered block determined according to the rule 6 above is assigned the third smallest number.

Rule 8: The remaining block is assigned the next number.

In the example of FIG. 16, according to the rule 5 above, the smallest of the numbers 1 through 4 (i.e., number 1) is assigned to the corner block of the first subgroup. Likewise, the smallest of the numbers 5 through 8 (number 5) is assigned to the corner block of the second subgroup; the smallest of the numbers 9 through 12 (number 9) is assigned to the corner block of the third subgroup; and the smallest of the numbers 13 through 16 (number 13) is assigned to the corner block of the fourth subgroup.

In the example of FIG. 16, according to the rule 6 above, the block whose x coordinate is the farthest from the block numbered 1 is assigned the next number 2 in the first subgroup. Likewise, the block whose x coordinate is the farthest from the block numbered 5 is assigned the next number 6 in the second subgroup; the block whose x coordinate is the farthest from the block numbered 9 is assigned the next number 10 in the third block; and the block whose x coordinate is the farthest from the block numbered 13 is assigned the next number 14 in the fourth subgroup.

In the example of FIG. 16, according to the rule 7 above, one of the two remaining blocks of which the x coordinate is the farthest from the block numbered 2 determined in the first subgroup according to the rule 6 is assigned the next number 3. In the second subgroup, one of the two remaining blocks of which the x coordinate is the farthest from the block numbered 6 determined according to the rule 6 is assigned the next number 7. In the third subgroup, one of the two remaining blocks of which the x coordinate is the farthest from the block numbered 10 determined according to the rule 6 is assigned the next number 11. In the fourth subgroup, one of the two remaining blocks of which the x coordinate is the farthest from the block numbered 14 determined according to the rule 6 is assigned the next number 15.

In the example of FIG. 16, according to the rule 8 above, the last remaining block of the first subgroup is assigned the next number 4; the last remaining block of the second subgroup is assigned the next number 8; the last remaining block of the third subgroup is assigned the next number 12; and the last remaining block of the fourth subgroup is assigned the next number 16.

In the manner explained above, the blocks in the upper left group are assigned the numbers 1 through 16 according to the above-described rules, and the blocks are updated in ascending order of their numbers. The four subgroups are selected one by one in a predetermined order. In the selected subgroup, the four blocks are selected one by one in a predetermined order. These arrangements minimize the possibility of erroneous detection. According to the rules discussed above, the order in which to update the blocks is determined in such a manner that the block whose x coordinate (i.e., coordinate in the horizontal direction) is the farthest from the currently selected block is preferentially selected next. This makes it possible to minimize the possibility of falsely detecting an act of sabotage particularly due to a horizontally moving object.

According to the rules 6 and 7 above, the order in which to update the blocks may alternatively be determined in such a manner that the block whose y coordinate (i.e., coordinate in the vertical direction) is the farthest from the currently selected block is preferentially selected next. This makes it possible to minimize the possibility of erroneously detecting an act of sabotage due to a vertically moving object.

[Block Shapes]

In the example shown in FIGS. 7A through 7F, the blocks are each shaped to be horizontally long and are moved in the horizontal direction. Alternatively, the blocks may be shaped to be long perpendicularly to the direction of their movement. In other words, the blocks may be moved perpendicularly to their longer direction.

Figure 17:
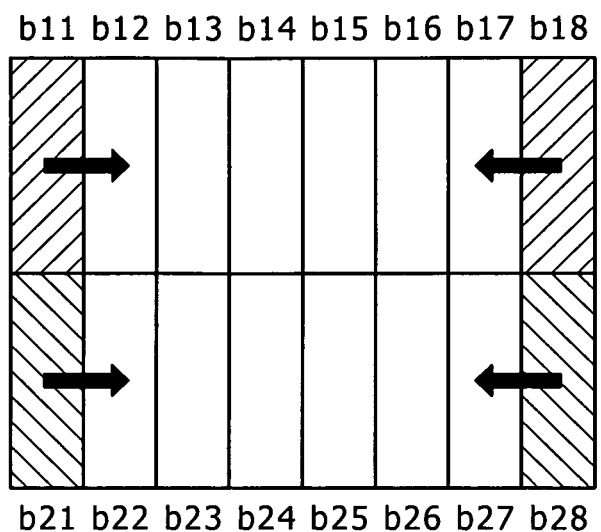
FIG. 17 is a schematic view showing a typical shape of blocks.

FIG. 17 is a schematic view showing a typical shape of blocks. In FIG. 17, the screen is divided into an upper half and a lower half portion. The half portions are each divided into eight blocks b11 through b18 or b21 through b28. As a result, the blocks are each shaped to be vertically long. The blocks to be updated are moved perpendicularly to their longer direction, i.e., in the horizontal direction. For example, if the imaging section is constrained to move only in the horizontal direction so that possible acts of sabotage are limited to the horizontal direction, then the movement in the horizontal direction need only be detected. Thus as shown in FIG. 17, the blocks may each be shaped to be longer perpendicularly to the horizontal direction in which changes can occur.

Figure 18:
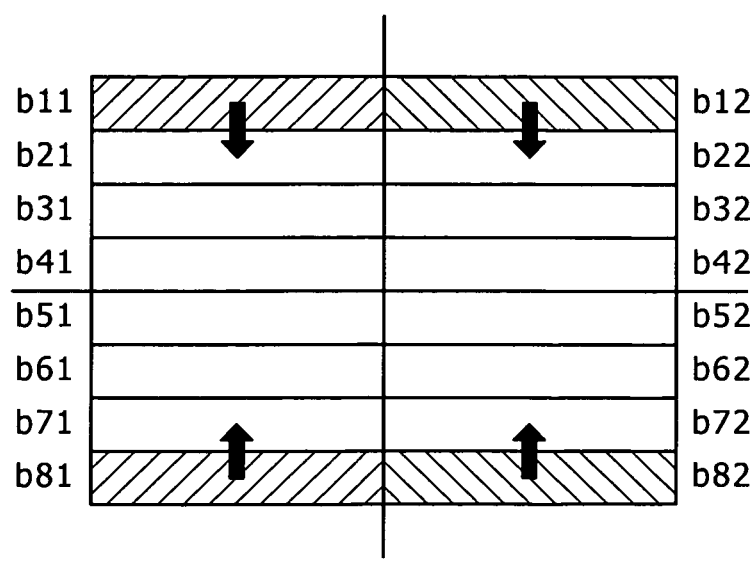
FIG. 18 is a schematic view showing another typical shape of blocks.

FIG. 18 is a schematic view showing another typical shape of blocks. In FIG. 18, the screen is divided into a left half and a right half portion. The half portions are each divided into eight blocks b11 through b81 or b12 through b82. As a result, the blocks are each shaped to be horizontally long. The blocks to be updated are moved perpendicularly to their longer direction, i.e., in the vertical direction. For example, if the imaging section is constrained to move only in the vertical direction so that possible acts of sabotage are limited to the vertical direction, then the movement in the vertical direction need only be detected. Thus as shown in FIG. 18, the blocks may each be shaped to be longer perpendicularly to the vertical direction in which changes can occur.

[Application of the Present Invention to Programs]

The series of the processes described above may be executed either by hardware or by software.

Where the series of the processes above are to be executed by software, the programs constituting the software may be either retrieved from dedicated hardware of the computer in use or installed over networks or from a suitable recording medium into a general-purpose computer or like equipment capable of executing diverse functions based on the installed programs.

The recording media that hold these programs are distributed to users not only as the recording media apart from their apparatuses and constituted by magnetic disks (including floppy disks), optical disks (including CD-ROM (Compact Disk-Read Only Memory) and DVD), magneto-optical disks (including MD (Mini-Disk)), or semiconductor memories, the media carrying the programs offered to the users; but also in the form of a flash ROM or a hard disk, the medium accommodating the programs and incorporated beforehand in the users' apparatuses.

In this specification, the steps describing the programs stored on the recording media represent not only the processes that are to be carried out in the depicted sequence (i.e., on a time series basis) but also processes that may be performed parallelly or individually and not necessarily chronologically.

It should be understood by those skilled in the art that various modifications, combinations, sub-combinations and alterations may occur depending on design requirements and other factor in so far as they are within the scope of the appended claims or the equivalents thereof.

What is claimed is:

1. An image processing apparatus comprising:
   acquisition means for acquiring image data of a number of images, each image representative of a video frame;
   division means for dividing the acquired image data of a respective video frame into a plurality of blocks;
   histogram calculation means for calculating a histogram of a designated one or ones of the plurality of blocks of the respective video frame;
   histogram storage means for storing the calculated histogram; and
   change determination means for determining whether a change has occurred in a respective image based on a degree of similarity between the calculated histogram of said designated one or ones of the plurality of blocks of the respective video frame and a previous histogram of the corresponding one or ones of the plurality of blocks of a previous video frame from storage in the histogram storage means; and
   alarm output means for counting a number of blocks of the respective image in which a change is determined to have occurred and for outputting an alarm if a comparison between the counted number and an alarm threshold value reveals that the counted number is above said alarm threshold value.

2. An image processing apparatus comprising:
   acquisition means for acquiring image data of an image;
   histogram calculation means for calculating a histogram of the acquired image data;
   histogram storage means for storing the calculated histogram that is updated sequentially; and
   change determination means for determining whether a change has occurred in the acquired image based on the degree of similarity between said calculated histogram and the previously stored histogram,
   and further comprising:
      division means for dividing said acquired image into N blocks, N being larger than one; and
      designation means for designating, every time said image data of a new image is acquired, sequentially M out of said N blocks, M being larger than one, as the blocks to be updated,
      wherein said histogram calculation means calculates said histogram of the designated M blocks, and
      said change determination means determines whether a change has occurred in said acquired image based on the degree of similarity between the calculated histogram of said designated M blocks on the one hand and the previous histogram of the corresponding M blocks being stored on the other hand.

3. The image processing apparatus according to claim 2, wherein said designation means designates sequentially said M blocks in such a manner that at least two of said M blocks differ from one another in the direction of positional change in said image.

4. The image processing apparatus according to claim 3, wherein said designation means designates M to be four so as to divide said image into four groups and designate one block from each of said four groups.

5. The image processing apparatus according to claim 4, wherein said division means designates sequentially said M blocks by preferentially selecting the farthest of the blocks.

6. The image processing apparatus according to claim 5, wherein said change determination means includes:
   similarity degree calculation means for calculating said degree of similarity between the calculated histogram of said designated M blocks on the one hand and the previous histogram of the corresponding M blocks being stored on the other hand; and
   similarity degree threshold value determination means for determining that a change has occurred in said M blocks of said image if a comparison between said calculated histogram and a similarity degree threshold value reveals that said degree of similarity is larger than said similarity degree threshold value.

7. The image processing apparatus according to claim 6, further comprising alarm output means for outputting an alarm if a change is determined to have occurred in said image.

8. The image processing apparatus according to claim 7, where said alarm output means includes:
   counter means for counting the number of blocks in which a change is determined to have occurred; and alarm threshold value determination means for outputting said alarm if a comparison between the number counted by said counter means and an alarm threshold value reveals that the counted number is above said alarm threshold value.

9. The image processing apparatus according to claim 3, wherein said division means divides said block in such a manner that the block side perpendicular to said direction of positional change becomes longer than the block side in parallel with said direction of positional change.

10. An image processing method comprising the steps of:
acquiring image data of a number of images, each image representative of a video frame;
dividing the acquired image data of a respective video frame into a plurality of blocks;
calculating a histogram of a designated one or ones of the plurality of blocks;
storing the calculated histogram;
determining whether a change has occurred in a respective image based on a degree of similarity between the calculated histogram of said designated one or ones of the plurality of blocks of the respective video frame and a previous histogram of the corresponding one or ones of the plurality of blocks of a previous video frame which were stored in the storing step; and
counting a number of blocks of the respective image in which a change is determined to have occurred and outputting an alarm if a comparison between the counted number and an alarm threshold value reveals that the counted number is above said alarm threshold value.

11. A non-transitory computer readable medium having stored thereon a program for causing a computer to execute a procedure comprising the steps of:
acquiring image data of a number of images, each image representative of a video frame;
dividing the acquired image data of a respective video frame into a plurality of blocks;
calculating a histogram of a designated one or ones of the plurality of blocks;
storing the calculated histogram;
determining whether a change has occurred in a respective image based on a degree of similarity between the calculated histogram of said designated one or ones of the plurality of blocks of the respective video frame and a previous histogram of the corresponding one or ones of the plurality of blocks of a previous video frame which were stored in the storing step; and
counting a number of blocks of the respective image in which a change is determined to have occurred and outputting an alarm if a comparison between the counted number and an alarm threshold value reveals that the counted number is above said alarm threshold value.

12. An image processing apparatus comprising:
an acquisition section configured to acquire image data of a number of images, each image representative of a video frame;
a division section to divide the acquired image data of a respective video frame into a plurality of blocks;
a histogram calculation section configured to calculate a histogram of a designated one or ones of the plurality of blocks;
a histogram storage section configured to store the calculated histogram;
a change determination section configured to determine whether a change has occurred in a respective image based on a degree of similarity between the calculated histogram of said designated one or ones of the plurality of blocks of the respective video frame and a previous histogram of the corresponding one or ones of the plurality of blocks of a previous video frame from storage in the histogram storage section; and
an alarm output section configured to count a number of blocks of the respective image in which a change is determined to have occurred and to output an alarm if a comparison between the counted number and an alarm threshold value reveals that the counted number is above said alarm threshold value.

13. An image processing apparatus comprising:
an acquisition section configured to acquire image data of a number of images, each image representative of a video frame;
a division section to divide the acquired image data of a respective video frame into a plurality of blocks;
a histogram calculation section configured to calculate a histogram of a designated one or ones of the plurality of blocks;
a histogram storage section configured to store the calculated histogram;
a change determination section configured to determine whether a change has occurred in a respective image based on a degree of similarity between the calculated histogram of said designated one or ones of the plurality of blocks of the respective video frame and a previous histogram of the corresponding one or ones of the plurality of blocks of a previous video frame from storage in the histogram storage section; and
an alarm output section configured to output an alarm if a predetermined change is determined to have occurred in the respective image,
said alarm output section includes:
a counter section configured to count a number of blocks of the respective image in which a change is determined to have occurred, and
an alarm threshold value determination section configured to output said alarm if a comparison between the number counted by said counter section and an alarm threshold value reveals that the counted number is above said alarm threshold value.

* * * * *